United States Patent [19]

Goto et al.

[11] Patent Number: 5,336,643
[45] Date of Patent: Aug. 9, 1994

[54] LOW EXPANSION TRANSPARENT CRYSTALLIZED GLASS-CERAMIC

[75] Inventors: Naoyuki Goto; Hisao Yatsuda, both of Sagamihara, Japan

[73] Assignee: Kabushiki Kaisha Ohara, Kanagawa, Japan

[21] Appl. No.: 32,977

[22] Filed: Mar. 18, 1993

[30] Foreign Application Priority Data

Sep. 14, 1992 [JP] Japan .................................. 4-270989

[51] Int. Cl.$^5$ .............................................. C03C 10/14
[52] U.S. Cl. ............................................ 501/4; 501/7; 501/69
[58] Field of Search ................................ 501/4, 69, 7

[56] References Cited

U.S. PATENT DOCUMENTS

| | | | |
|---|---|---|---|
| 4,093,468 | 6/1978 | Boitel et al. | 501/4 |
| 5,070,045 | 12/1991 | Comte et al. | 501/4 |
| 5,179,045 | 1/1993 | Aitken et al. | 501/4 |

FOREIGN PATENT DOCUMENTS 2-302338 12/1990 Japan .

*Primary Examiner*—Karl Group
*Attorney, Agent, or Firm*—Hedman, Gibson & Costigan

[57] ABSTRACT

A low expansion crystallized glass-ceramic which has a coefficient of thermal expansion ($\alpha \times 10^{-7}/°$ C.) within the range of from $-10$ to $+10$, has a remarkably reduced variation in the coefficient of thermal expansion accompanied by variation in heat treatment conditions, has an excellent optical homogeniety owing to reduced melting temperature in the base glass and has an improved transparency is obtained by restricting the ratio in weight of $Al_2O_3$ to ($SiO_2 + P_2O_5$) within the range of 0.38 and 0.50 and adding MgO, BaO and ZnO of specific content ranges as essential ingredients in a base glass of a $SiO_2$-$Al_2O_3$-$Li_2O$ system containing $P_2O_5$ as an optional ingredient and $TiO_2$ and $ZrO_2$ as nucleating agents.

4 Claims, No Drawings

LOW EXPANSION TRANSPARENT CRYSTALLIZED GLASS-CERAMIC

BACKGROUND OF THE INVENTION

This invention relates a low expansion transparent crystallized glass-ceramic suitable for use as various materials for which low thermal expansion characteristics and transparency are strictly required such, for example, as materials for optical parts, materials for large type telescope mirror blanks, materials for a ring laser gyroscope, materials for precision parts such as parts of a reference gauge for precision measurement and various electronic materials.

Known in the art are low expansion transparent crystallized glass-ceramics formed by melting and subjecting to heat treatment a base glass of a $SiO_2$-$Al_2O_3$-$Li_2O$ system containing a nucleating agent. These crystallized glass-ceramics generally contain beta-quartz solid solution as a main crystalline phase and have a coefficient of thermal expansion of ($\alpha \times 10^{-7}$/° C.) within the range of from $-10$ to $+10$.

Recent tendencies in the industry are that higher and more strict characteristics as described below are required for the materials used for the above described purposes:

(1) The glass-ceramic is uniform and stable and has little variation in the coefficient of thermal expansion in spite of variation in heat treatment conditions.

(2) The base glass can be molten and refined easily so that the glass-ceramic substantially has little or no cord, foam or inclusion and has an optical homogeniety of a high degree.

(3) The crystal produced is fine and the glass-ceramic has an excellent transparency, particularly an excellent light transmissivity in the visible ray region.

(4) The glass-ceramic contains substantially little or no $Na_2O$ and $K_2O$ ingredients, because if the glass-ceramic contains $Na_2O$ and $K_2O$ ingredients, ions of these ingredients will diffuse in the course of processing of the glass-ceramic and thereby adversely affect properties of the glass-ceramic with resulting occurrence of troubles. Besides, these ingredients will increase the value of the coefficient of thermal expansion to an undesirable degree.

As one of the above described prior art low expansion transparent crystallized glass-ceramic, the U. S. Pat. No. 3,499,773 discloses a low expansion transparent crystallized glass-ceramic product selectively imparting an opaque portion obtained from a base glass $SiO_2$-$Al_2O_3$-$Li_2O$ system containing one or more of $TiO_2$, $ZrO_2$ and $SnO_2$ as a nucleating agent and optionally containing a small amount of other ingredients such as CaO, MgO and BaO. The U. S. Pat. No. 4,285,728 discloses crystallized glass-ceramics for telescope mirror blanks obtained from a base glass of a $SiO_2$-$Al_2O_3$-$Li_2O$-$(CaO+MgO+ZnO+Na_2O)$ system containing $TiO_2$ and $ZrO_2$ as nucleating agents. The U. S. Pat. No. 4,851,372 discloses a transparent crystallized glass-ceramic for telescope mirror blanks obtained from a basic glass of $SiO_2$-$Al_2O_3$-$Li_2O$-$ZnO$-$BaO$ system containing $TiO_2$ and $ZrO_2$ as nucleating agents in which the value of $\alpha$ becomes substantially zero in the temperature range between 0° C. and 50° C.

The specifications of these publications, however, do not particularly describe the specific problems to be solved by the present invention, particularly the recent requirements of the industry (1), (2) and (3) described above. In fact, these prior art crystallized glass-ceramics are disadvantageous in that variation of the coefficient of thermal expansion accompanied by variation of heat treatment conditions is large and also that high temperatures of 1500° C. and over are required for melting the base glasses and hence it is difficult to manufacture products having an excellent optical homogeniety.

The U.S. Pat. No. 3,380,818 discloses a low expansion transparent crystallized glass-ceramic having a liquidus temperature below 2460° F. and formability which is suitable for large-scale production and obtained from a base glass of a $SiO_2$-$Al_2O_3$-$Li_2O$-$MgO$ system containing $TiO_2$ and $ZrO_2$ as nucleating agents. The U. S. Pat. No. 4,018,612 discloses a transparent crystallized glass-ceramic used for cooking purposes having an excellent anticorrosion property to detergents and an excellent infrared transmissivity and obtained from a base glass of a $SiO_2$-$Al_2O_3$-$Li_2O$-$MgO$-$ZnO$ system containing $TiO_2$ and $ZrO_2$ as nucleating agents. The U.S. Pat. No. 4,707,458 discloses a transparent crystallized glass-ceramic for a ring laser gyroscope having a coefficient of thermal expansion which is substantially zero and obtained from a base glass of a $SiO_2$-$Al_2O_3$-$Li_2O$-$MgO$-$ZnO$ system containing $TiO_2$ and $ZrO_2$ as nucleating agents. Further, European Patent Application No. EP-A-0437228 discloses a crystallized glass-ceramic suitable for use as a cooktop sheet which exhibits substantially little or no distortion even by a fast heat treatment for efficient production and obtained from a base glass of a $SiO_2$-$Al_2O_3$-$Li_2O$-$MgO$-$ZnO$-$BaO$ and/or $SrO$ system containing $TiO_2$ and $ZrO_2$ as nucleating agents.

These crystallized glass-ceramics, however, do not suggest any improvement about the required properties described in (1), (2) and (3) above. In fact, these crystallized glasses are disadvantageous in that the coefficient of thermal expansion tends to vary largely with variation in heat treatment conditions and hence it is difficult to impart a uniform coefficient of thermal expansion to respective parts of the products made from the glass-ceramics and also to respective manufacturing lots of the glass-ceramics. Moreover, high temperatures of about 1550° C. and over are required for melting and refining the base glasses and this makes it difficult to manufacture products having an excellent optical homogeniety in a large scale.

It is, therefore, an object of the present invention to provide a low expansion transparent crystallized glass-ceramic with improved properties, namely, having reduced variation in the coefficient of thermal expansion ($\alpha$) accompanied by variation in conditions for heat treatment for crystallization and having a more excellent optical homogeniety owing to improved melting and refining properties of the base glass.

SUMMARY OF THE INVENTION

Accumulated studies and experiments made by the inventors of the present invention for achieving the above described object of the invention have resulted in a finding, which has led to the present invention, that a desired crystallized glass-ceramic which has a coefficient of thermal expansion ($\alpha \times 10^{-7}$/° C.) within the range of from $-10$ to $+10$, has a remarkably reduced variation in the coefficient of thermal expansion accompanied by variation in heat treatment conditions, has a more excellent optical homogeniety owing to reduced melting temperature in the base glass and has an improved transparency can be obtained by restricting the ratio in weight of $Al_2O_3$ to $(SiO_2+P_2O_5)$ within a specific range and adding MgO, BaO and ZnO of specific content ranges as essential ingredients in a base glass of a $SiO_2$-$Al_2O_3$-$Li_2O$ system containing $P_2O_5$ as an optional ingredient and $TiO_2$ and $ZrO_2$ as nucleating agents.

The low expansion transparent crystallized glass-ceramic achieving the above described object of the invention is characterized in that the glass-ceramic is formed by melting and subjecting to heat treatment a base glass comprising in weight percent:

| | |
|---|---|
| $SiO_2$ | 50–62.5% |
| $P_2O_5$ | 0–7% |
| $Al_2O_3$ | 20–27% |
| $Li_2O$ | 3–6% |
| MgO + BaO + ZnO | 3–10% |
| in which | |
| MgO | 0.6–5% |
| BaO | 0.5–5% |
| ZnO | 0.3–5% |
| $TiO_2$ | 1–5% |
| $ZrO_2$ | 1–5% |
| $As_2O_3$ and/or $Sb_2O_3$ | 0–2% | wherein the weight ratio of $Al_2O_3$ to $(SiO_2+P_2O_5)$ is between 0.38 and 0.50, said crystallized glass ceramic containing beta-quartz solid solution as a main crystalline phase and having a coefficient of thermal expansion ($\alpha \times 10^{-7}/°$ C.) within the range of from $-10$ to $+10$.

In one aspect of the invention, a low expansion transparent crystallized glass-ceramic as defined above is characterized in that difference in coefficients of thermal expansion between a crystallized glass-ceramic formed by subjecting the base glass to heat treatment for crystallization under the temperature of 780° C. for 10 hours and a crystallized glass-ceramic formed by subjecting the base glass to heat treatment for crystallization under the temperature of 820° C. for 10 hours is within the range of from 0.3 to 1.2.

In the above description and in the appended claims, the term "beta-quartz" is used to designate comprehensively both beta-quartz and beta-eucryptite ($Li_2O\cdot Al_2O_3\cdot 2SiO_2$ (where $Li_2O$ can be substituted by MgO or ZnO) which has a structure closely resembling beta-quartz.

DETAILED DESCRIPTION OF THE INVENTION

The composition of oxides of the low expansion cyrstallized glass-ceramic is expressed by the composition of oxides of the base glass. The above described content ranges of the respective ingredients have been selected for the reasons stated below. In the following description, the content ranges of the respective ingredients are expressed in weight percent.

If the amount of the $SiO_2$ ingredient is below 50% the grain diameter of crystal in the produced crystallized glass-ceramic becomes too large with resulting deterioration in transparency. If the amount of $SiO_2$ ingredient exceeds 62.5%, melting and refining of the base glass become difficult with resulting deterioration in the optical homogeniety of the glass-ceramic product.

The $P_2O_5$ ingredient is an ingredient which, by substituting a part of the $SiO_2$ ingredient by it, enables the thermal expansion curve of the crystallized glass-ceramic to become more gradual and also improves the melting property of the base glass. If, however, the amount of the $P_2O_5$ ingredient exceeds 7%, the grain diameter of crystal becomes too large with resulting deterioration in transparency to a significant extent.

If the amount the $Al_2O_3$ ingredient is below 20%, difficulty arises in melting of the base glass with resulting difficulty in obtaining a product which is homogeneous and free from opaqueness. If the amount of this ingredient exceeds 27%, difficulty also arises in melting of the base glass with resulting difficulty in obtaining a homogeneous product. For restraining variation in the coefficient of thermal expansion of the crystallized glass-ceramic product accompanied by variation in heat treatment conditions, it is essential, together with the addition of the three ingredients of MgO, BaO and ZnO, that the ratio in weight of the $Al_2O_3$ ingredient to the total amount of the $SiO_2$ and $P_2O_5$ ingredients should be between 0.38 and 0.50. If this ratio is below 0.38, the melting property of the base glass is deteriorated whereas, if this ratio exceeds 0.50, the stability of the base glass is deteriorated and, as a result, the homogeniety of the product tends to be impaired.

The $Li_2O$ ingredient is an important ingredient together with the $SiO_2$ and $Al_2O_3$ ingredients for constituting beta-quartz. If the amount of the $Li_2O$ ingredient is below 3%, the melting property of the base glass is deteriorated with resulting deterioration in the homogeniety of the product and difficulty in separating crystal of a fine grain. If the amount of the $Li_2O$ ingredient exceeds 6%, the grain diameter of crystal becomes too large with resulting deterioration in transparency of the product.

In addition to the above described weight ratio of $Al_2O_3$ to $(SiO_2+P_2O_5)$, three ingredients of MgO, BaO and ZnO are important ingredients which, by coexistence thereof in the base glass, effectively restrain variation in the coefficient of thermal expansion accompanied by variation in heat treatment conditions and thereby maintain low expansion characteristics of the glass-ceramic product and, without impairing transparency of the product, improves melting property of the base glass and thereby remarkably improves the homogeniety of the products. If, however, the amount of the MgO ingredient is below 0.6%, the above described advantages cannot be obtained whereas, if the amount of the MgO ingredient exceeds 5%, it becomes difficult to cause a desired crystal phase to be produced in the glass-ceramic and, besides, deterioration in transparency takes place. If the amount of the BaO ingredient is below 0.5%, the above described advantages cannot be obtained whereas, if the amount of BaO ingredient exceeds 5%, the melting property and stability to devitrification of the base glass are both deteriorated with resulting deterioration in the homogeniety of the product. If the amount of the ZnO ingredient is below 0.3%, the above described advantages cannot be obtained whereas, if the amount of the ZnO ingredient exceeds 5%, stability to devitrification of the base glass is deteriorated with resulting deterioration in the homogeniety of the product and, besides, the crystal phase of the product is deteriorated and transparency of the product is impaired. If the total amount of these three ingredients is below 3%, the above described advantages cannot be obtained whereas, if the total amount exceeds 10, the crystal phase in the product is changed with resulting undesirable increase in the coefficient of thermal expansion.

The $TiO_2$ and $ZrO_2$ ingredients are indispensable as nucleating agents. If the amount of each of these ingredients is below 1%, a desired crystal cannot be produced whereas, if the amount of each of these ingredients exceeds 5%, transparency of the product is deteriorated, stability to devitrification is deteriorated and homogeniety of the product is impaired.

The $As_2O_3$ and/or $Sb_2O_3$ ingredients may be optionally added as refining agents in melting the base glass for obtaining a homogeneous product. The total amount of 2% or below for one or two of these ingredients will be sufficient for achieving this purpose.

In addition to the above described ingredients, one or more of PbO, SrO, CaO, $B_2O_3$, $F_2$, $La_2O_3$, $Bi_2O_3$, $WO_3$, $Y_2O_3$, $Gd_2O_3$ and $SnO_2$ ingredients may be added up to the amount of 2% in total respectively within the range in which desired properties of the crystallized glass-ceramic according to the invention will not be impaired.

EXAMPLES

Examples of the low expansion crystallized glass-ceramic of the present invention will now be described in comparison with comparative examples. Table 1 shows, with regard to examples of composition of the low expansion transparent crystallized glass-ceramic of the present invention (Examples No. 1 to No. 15) and comparative examples of composition of the prior art low expansion crystallized glass-ceramic (Comparative Examples No. 1 to No. 3), melting temperatures and time of the base glass, and coefficients of thermal expansion ($\alpha 1 \times 10^{-7}/°C$.) and ($\alpha 2 \times 10^{-7}/°C$.) of glass-ceramics obtained by reheating molten and annealed base glass, subjecting the base glass to heating treatment for nuclei formation (700° C. for 10 hours) and thereafter subjecting the base glass to heat treatment for crystallization under two different conditions (i.e., under 780° C. for 10 hours and 820° C. for 10 hours) as well as difference ($\Delta\alpha$) between these coefficients of thermal expansion. Table 1 shows also wavelengths (nm) of light producing light transmissivity of 80% in a specimen with two polished surfaces having thickness of 5 mm of the crystallized glass-ceramics obtained by subjecting the base glass to the above described heat treatment for crystallization under 820° C. for 10 hours as well as results of examination of the homogeniety of the internal portion of the glass-ceramics.

TABLE 1

| No. | Examples | | | | | | | | | | | | | | | Comparative Examples | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 1 | 2 | 3 |
| Composition (in weight %) | | | | | | | | | | | | | | | | | | |
| $SiO_2$ | 50.0 | 53.0 | 55.0 | 57.5 | 59.5 | 60.0 | 61.0 | 61.0 | 60.0 | 60.0 | 61.0 | 58.5 | 60.0 | 55.0 | 57.0 | 57.0 | 67.7 | 68.5 |
| $P_2O_5$ | 6.0 | 4.0 | 5.0 | 1.0 | | | | | | 3.0 | | | | | | 5.0 | | |
| $Al_2O_3$ | 26.0 | 26.5 | 25.0 | 25.0 | 25.4 | 23.5 | 23.9 | 24.0 | 25.0 | 24.0 | 23.5 | 24.0 | 23.8 | 25.5 | 26.0 | 22.5 | 18.9 | 18.6 |
| $Li_2O$ | 3.5 | 3.9 | 3.8 | 4.0 | 4.6 | 4.5 | 4.5 | 4.3 | 4.4 | 4.5 | 4.2 | 4.1 | 4.5 | 4.6 | 5.0 | 3.5 | 3.5 | 3.0 |
| MgO | 5.0 | 1.0 | 1.6 | 4.0 | 2.5 | 2.0 | 2.0 | 2.7 | 1.5 | 1.2 | 0.8 | 2.4 | 3.4 | 2.0 | 1.5 | 0.3 | 1.1 | 2.2 |
| BaO | 2.5 | 3.5 | 1.6 | 1.5 | 1.3 | 2.0 | 2.6 | 1.5 | 3.0 | 1.5 | 2.9 | 2.4 | 2.0 | 3.0 | 5.0 | 2.5 | 0.9 | 1.2 |
| ZnO | 2.5 | 2.5 | 2.5 | 1.5 | 1.2 | 2.0 | 0.5 | 1.0 | 0.6 | 0.3 | 2.9 | 3.2 | 1.4 | 5.0 | 0.9 | 2.1 | 1.6 | |
| MgO + BaO + ZnO | 10.0 | 7.0 | 5.7 | 7.0 | 5.0 | 6.0 | 5.1 | 5.2 | 5.1 | 3.0 | 6.6 | 8.0 | 6.8 | 10.0 | 7.4 | 4.9 | 3.6 | 3.4 |
| CaO | | | | | | | | | | | | | | | | 2.0 | | |
| $Na_2O$ | | | | | | | | | | | | | | | | 0.7 | 0.2 | |
| $K_2O$ | | | | | | | | | | | | | | | | | | 0.2 |
| $TiO_2$ | 1.5 | 2.5 | 2.5 | 2.0 | 2.5 | 2.0 | 2.5 | 2.3 | 2.3 | 2.6 | 2.1 | 2.5 | 2.4 | 2.3 | 2.2 | 2.3 | 3.0 | 3.9 |
| $ZrO_2$ | 2.0 | 2.5 | 2.0 | 2.5 | 1.0 | 3.0 | 2.0 | 2.2 | 2.2 | 1.9 | 1.6 | 1.9 | 1.5 | 1.6 | 1.4 | 1.4 | 2.0 | 2.0 |
| $As_2O_3$ | 1.0 | 0.6 | | 1.0 | 1.0 | 1.0 | 1.0 | 1.0 | 1.0 | 1.0 | 1.0 | 1.0 | 1.0 | | 1.0 | 1.0 | 0.9 | 0.6 |
| $Sb_2O_3$ | | | 1.0 | | | | | | | | | | | 1.0 | | 0.7 | | |
| $Al_2O_3/(SiO_2 + P_2O_5)$ | 0.46 | 0.47 | 0.42 | 0.43 | 0.43 | 0.39 | 0.39 | 0.39 | 0.42 | 0.38 | 0.39 | 0.41 | 0.40 | 0.46 | 0.46 | 0.36 | 0.28 | 0.27 |
| Base glass | | | | | | | | | | | | | | | | | | |
| Melting temperature (°C.) | 1470 | 1470 | 1480 | 1490 | 1500 | 1500 | 1500 | 1500 | 1500 | 1500 | 1500 | 1480 | 1490 | 1480 | 1480 | 1600 | 1650 | 1650 |
| Melting (hr) | 8 | 9 | 12 | 10 | 8 | 8 | 8 | 8 | 8 | 10 | 9 | 6 | 8 | 8 | 7 | 10 | 10 | 16 |
| Crystallized glass-ceramic | | | | | | | | | | | | | | | | | | |
| $\alpha 1$ (treated at 780° C.) | +8.0 | +6.0 | −6.5 | +3.5 | −0.9 | +3.4 | −0.6 | +0.6 | −1.3 | −0.8 | −1.1 | −2.8 | +0.4 | +2.0 | +1.1 | −0.2 | −0.9 | −0.9 |
| $\alpha 2$ (treated at 820° C.) | +6.8 | +6.8 | −7.0 | +2.5 | −1.5 | +2.6 | −1.3 | −0.3 | −0.8 | −1.3 | −1.8 | −3.2 | −0.4 | +1.7 | +0.7 | −2.0 | −3.9 | −3.4 |
| $\Delta\lambda$ | 1.2 | 0.8 | 0.5 | 1.0 | 0.6 | 0.8 | 0.7 | 0.9 | 0.5 | 0.5 | 0.7 | 0.4 | 0.8 | 0.3 | 0.4 | 1.8 | 3.0 | 2.5 |
| $T_{80}$ (nm) | 442 | 430 | 425 | 432 | 424 | 440 | 405 | 424 | 412 | 416 | 418 | 435 | 425 | 445 | 440 | 450 | 460 | 455 |
| Homogeneity | ○ | ○ | ○ | ○ | ○ | ○ | ○ | ○ | ○ | ○ | ○ | ○ | ○ | ○ | ○ | x | x | x |

The measurement of the melting conditions was made in accordance with a measuring method according to which materials such as oxides, carbonates and nitrates are measured and mixed so as to provide glass of 2500 grams, these materials are put in a platinum crucible in a furnace which has previously been adjusted in heating temperature depending upon ease or difficulty in melting of the materials due to the composition and are molten while being stirred, and the state of the glass until it reaches a substantially defoamed state is observed with the naked eye. In Table 1, the value of $\alpha$ in the case of heat treatment for crystallization under the temperature of 800° C. for 10 hours is not described. This value was somewherer between $\alpha 1$ and $\alpha 2$. The measurement of the homogeniety of the product was conducted by employing the cord test according to the schlieren method with respect to a specimen of about 80 mm × about 80 mm × about 10 mm cut from a block obtained by forming and annealing the molten and refined glass to a sheet having a thickness of about 40 mm. Results of this measurement are shown by the marks ○, Δ and × Table 1 which respectively indicate "excellent","good" and "poor".

By subjecting the base glasses of the examples shown in Table 1 to the nuclei forming heat treatment under 670° C. to 750° C. for 2 to 10 hours and thereafter subjecting them to the heat treatment for crystallization under 770° C. to 850° C. for 2 to 10 hours, various values of α within the range of −10 to +10 other than those described above will be obtained. As a result of X-ray analysis, these crystallized glass-ceramics have been found to contain beta-quartz solid solution as a predominant crystal phase.

As shown in Table 1 the melting condition of the base glasses of the examples shown is 1500° C. or below for 8 to 12 hours. This melting condition is advantageous in that little dissipation of volatile ingredients such as $Li_2O$ occurs and is much superior to the melting condition of the base glasses of the comparative examples which is 1600° C. to 1650° C. for 10 to 15 hours. Thus, the homogeniety of the glass-ceramic of the present invention is superior to the prior art glass-ceramics. As regards the value of α, the comparative examples exhibit large values of 1.8 to 3.0 whereas the examples of the present invention exhibit smaller values of 0.3 to 1.2. Thus, it will be understood that the glass-ceramic of the present invention has little variation in the value α due to heat treatment conditions and therefore is much more stable than the prior art glass-ceramics. In light transmissivity (T80) also, the comparative examples exhibit values of 450 nm or over whereas the examples of the present invention exhibit values within the range of from 405 nm to 442 nm and, accordingly, little coloring or opaqueness takes place in the glass-ceramic of the present invention and transparency thereof is much superior to the prior art glass-ceramics.

As described in the foregoing, according to the low expansion crystallized glass-ceramic of the present invention, by restricting the ratio in weight of $Al_2O_3$ to ($SiO_2+P_2O_5$) within a specific range and adding MgO, BaO and ZnO of specific content ranges as essential ingredients in a base glass of a $SiO_2$-$Al_2O_3$-$Li_2O$ system containing $P_2O_5$ as an optional ingredient and $TiO_2$ and $ZrO_2$ as nucleating agents, the crystallized glass-ceramic obtained has the above described low coefficients of thermal expansion, has a remarkably reduced variation in the coefficient of thermal expansion accompanied by variation in heat treatment conditions, and has excellent transparency and optical homogeniety.

What is claimed is:

1. A low expansion transparent crystallized glass-ceramic formed by melting and subjecting to heat treatment a base glass consisting essentially of in weight percent:

| | |
|---|---|
| $SiO_2$ | 50–62.5% |
| $P_2O_5$ | 0–7% |
| $Al_2O_3$ | 20–27% |
| $Li_2O$ | 3–6% |
| MgO + BaO + ZnO | 3–10% |
| in which | |
| MgO | 0.6–5% |
| BaO | 0.5–5% |
| ZnO | 0.3–5% |
| $TiO_2$ | 1–5% |
| $ZrO_2$ | 1–5% |
| $As_2O_3$ and/or $Sb_2O_3$ | 0–2% | wherein the weight ratio of $Al_2O_3$ to ($SiO_2+P_2O_5$) is between 0.38 and 0.50, said crystallized glass ceramic containing beta-quartz solid solution as a main crystalline phase and having a coefficient of thermal expansion ($\alpha \times 10^{-7}$/° C.) within the range of from −10 to +10.

2. A low expansion transparent crystallized glass-ceramic as defined in claim 1 wherein the difference in coefficients of thermal expansion between subjecting the base glass to heat treatment for crystallization under the temperature of 780° C. for 10 hours and subjecting the base glass to heat treatment for crystallization under the temperature of 820° C. for 10 hours is within the range of from 0.3 to 1.2.

3. A low expansion transparent crystallized glass-ceramic as defined in claim 1 wherein the weight percent of $SiO_2$ is from 50–61%.

4. A low expansion crystallized glass-ceramic as defined in claim 1 wherein the $P_2O_5$ content is 0%.

* * * * *